US010228951B1

(12) United States Patent
Kothari et al.

(10) Patent No.: US 10,228,951 B1
(45) Date of Patent: Mar. 12, 2019

(54) OUT OF ORDER STORE COMMIT

(71) Applicant: Apple Inc., Cupertino, CA (US)

(72) Inventors: Kulin N. Kothari, Cupertino, CA (US); Mridul Agarwal, Sunnyvale, CA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 552 days.

(21) Appl. No.: 14/831,661

(22) Filed: Aug. 20, 2015

(51) Int. Cl.
*G06F 9/38* (2018.01)
*G06F 9/30* (2018.01)

(52) U.S. Cl.
CPC ........ *G06F 9/3857* (2013.01); *G06F 9/30043* (2013.01); *G06F 9/3855* (2013.01); *G06F 9/3867* (2013.01)

(58) Field of Classification Search
CPC ............................ G06F 9/30043; G06F 9/3867
USPC ......................................................... 712/218
See application file for complete search history.

(56) References Cited

U.S. PATENT DOCUMENTS

| 5,185,871 | A  | * | 2/1993 | Frey ...................... | G06F 9/3834 711/124 |
| 6,219,773 | B1 | * | 4/2001 | Garibay, Jr. ........ | G06F 9/30043 710/52 |
| 7,660,971 | B2 |   | 2/2010 | Agarwal et al. | |
| 7,725,686 | B2 | * | 5/2010 | Osanai ................. | G06F 9/3824 712/218 |
| 2002/0199066 | A1 | * | 12/2002 | Chaudhry ........... | G06F 12/0253 711/137 |
| 2007/0250669 | A1 | * | 10/2007 | Arimilli ............... | G06F 9/3842 711/154 |
| 2008/0082794 | A1 | * | 4/2008 | Yu ....................... | G06F 9/3824 712/218 |
| 2009/0157944 | A1 | * | 6/2009 | Robinson ............. | G06F 9/3834 711/100 |
| 2012/0173848 | A1 |   | 7/2012 | Sun et al. | |

(Continued)

OTHER PUBLICATIONS

Bell, G. B. et al. Deconstructing Commit. 2004 IEEE ISPASS, pp. 68-77 [online], [retrieved on Sep. 22, 2017]. Retrieved from the Internet <URL: http://ieeexplore.ieee.org/document/1291357/> <DOI: 10.1109/ISPASS.2004.1291357>.*

(Continued)

*Primary Examiner* — Aimee Li
*Assistant Examiner* — Shawn Doman
(74) *Attorney, Agent, or Firm* — Meyertons Hood Kivlin Kowert and Goetzel PC; Rory D. Rankin

(57) ABSTRACT

Systems, apparatuses, and methods for committing store instructions out of order from a store queue are described. A processor may store a first store instruction and a second store instruction in the store queue, wherein the first store instruction is older than the second store instruction. In response to determining the second store instruction is ready to commit to the memory hierarchy, the processor may allow the second store instruction to commit before the first store instruction, in response to determining that all store instructions in the store queue older than the second store instruction are non-speculative. However, if it is determined that at least one store instruction in the store queue older than the second store instruction is speculative, the processor may prevent the second store instruction from committing to the memory hierarchy before the first store instruction.

17 Claims, 10 Drawing Sheets

(56) References Cited

U.S. PATENT DOCUMENTS

2014/0372732 A1    12/2014  Fleischman et al.
2015/0006496 A1     1/2015  Rajwar et al.

OTHER PUBLICATIONS

Cristal, A. et al. Out-of-Order Commit Processors. Proceedings of the 10th International Symposium on High Performance Computer Architecture, p. 48 [online], [retrieved on Sep. 22, 2017]. Retrieved from the Internet <URL: http://ieeexplore.ieee.org/stamp/stamp.jsp?arnumber=1410064> <DOI: 10.1109/HPCA.2004.10008>.*
Sha, et al., "Scalable Store-Load Forwarding via Store Queue Index Prediction", Proceedings of the 38th Annual IEEE/ACM International Symposium on Microarchitecture (MICRO'05), Nov. 1, 2005, 14 pages, IEEE Computer Society, Washington, DC, USA.
Cristal, et al., "Out-of-Order Commit Processors", HPCA '04 Proceedings of the 10th International Symposium on High Performance Computer Architecture, Feb. 14, 2004, 12 pages, IEEE Computer Society, Washington, DC, USA.
Wenisch, et al., "Mechanisms for Store-wait-free Multiprocessors", In Proceedings of the 34th Annual International Symposium on Computer Architecture, Jun. 9, 2007, 12 pages, ACM, New York, NY, USA.

\* cited by examiner

OUT OF ORDER STORE COMMIT

BACKGROUND

Technical Field

Embodiments described herein relate to the field of processors and more particularly, to processing store instructions in a processor.

Description of the Related Art

A processor generally includes hardware circuitry designed to execute program instructions defined in a particular instruction set architecture implemented by the processor. A sequence of instructions as defined in the instruction set architecture can be provided to the processor to implement desired functionality in a system that includes the processor. Processors generally include support for load memory operations and store memory operations to facilitate transfer of data between the processors and memory to which the processors are coupled. Generally speaking, a load memory operation is an operation specifying a transfer of data from a memory location to the processor. A store memory operation is an operation specifying a transfer of data from the processor to memory. Load and store memory operations may be an implicit part of an instruction which includes a memory operation, or may be explicit instructions, in various implementations. Load and store memory operations are more succinctly referred to herein as loads and stores, respectively.

A given load/store may specify the transfer of one or more bytes beginning at a memory address calculated during execution of the load/store. This memory address is referred to as the data address of the load/store. The load/store itself (or the instruction from which the load/store is derived) is located by an instruction address used to fetch the instruction, also referred to as the program counter address (or PC). The data address is typically calculated by adding one or more address operands specified by the load/store to generate an effective address or virtual address, which may optionally be translated through an address translation mechanism to a physical address of a memory location within the memory.

In some processors, speculatively-executed loads and stores are typically held in queues until necessary criteria is met before making the loads and stores architecturally visible (i.e., visible to software). In these processors, values from stores are not committed to the memory hierarchy when they execute. Rather, the stores, including the memory address and the store data, are buffered in a store queue until they are ready to be committed. When a store commits, the data of the store is written to the memory hierarchy (either cache or memory).

As processor technology evolves and chip structures grow, the store queue can become the gating factor. Increasing the size of the store queue is often undesirable since the store queue is often a content addressable memory (CAM). Also, the store queue holds store data so the store queue is typically large. In some cases, an older store may be queued in the store queue for a relatively long time, preventing younger stores from being committed. As used herein, the terms "older" and "younger" refer to relative ages of instructions in an instruction stream. Said another way, older instructions precede younger instructions in program order. Typically, stores in the store queue are committed in order. Consequently, if there is an older store that is a cache miss or for some other reason is taking a long time to commit, the older store holds up younger non-speculative stores and causes the store queue to fill up. This in turn causes the processor to stall as new stores are prevented from being issued to the store queue.

SUMMARY

Systems, apparatuses, and methods for committing store instructions out of order from the store queue.

In one embodiment, a processor includes at least an issue unit, one or more reservation stations, and one or more execution units. The execution units may include a load store unit having a store queue that stores speculatively executed store instructions. Store instructions may be issued out of the reservation stations into the store queue to wait until they are ready to be committed to the memory hierarchy of the processor.

The store queue may include a plurality of entries for storing a plurality of store instructions. In one embodiment, each entry may include at least a status indicator that indicates whether the store is speculative or non-speculative, and a pending miss request indicator. When a store instruction reaches a non-speculative state, the store instruction can no longer be flushed from the processor. In one embodiment, the store instruction may achieve non-speculative status when all older stores to the same address are complete, all older loads are complete, all older barrier instructions are complete, and all older branch instructions are resolved. In one embodiment, the pending miss request indicator may indicate that a corresponding store instruction is a cache miss and that the store is still waiting on the fill to come back from memory or a next level cache.

In one embodiment, if an older store instruction is not ready to be committed, the processor may commit one or more younger store instructions from the store queue ahead of the older store instruction responsive to detecting various conditions. In some embodiments, in response to determining the second store instruction is ready to commit to the memory hierarchy, the processor may allow a younger store instruction to commit before an older store instruction, in response to determining that all store instructions in the store queue older than the second store instruction are non-speculative. However, if it is determined that at least one store instruction in the store queue older than the younger store instruction is speculative, the processor may prevent the younger store instruction from committing to the memory hierarchy before the first store instruction.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
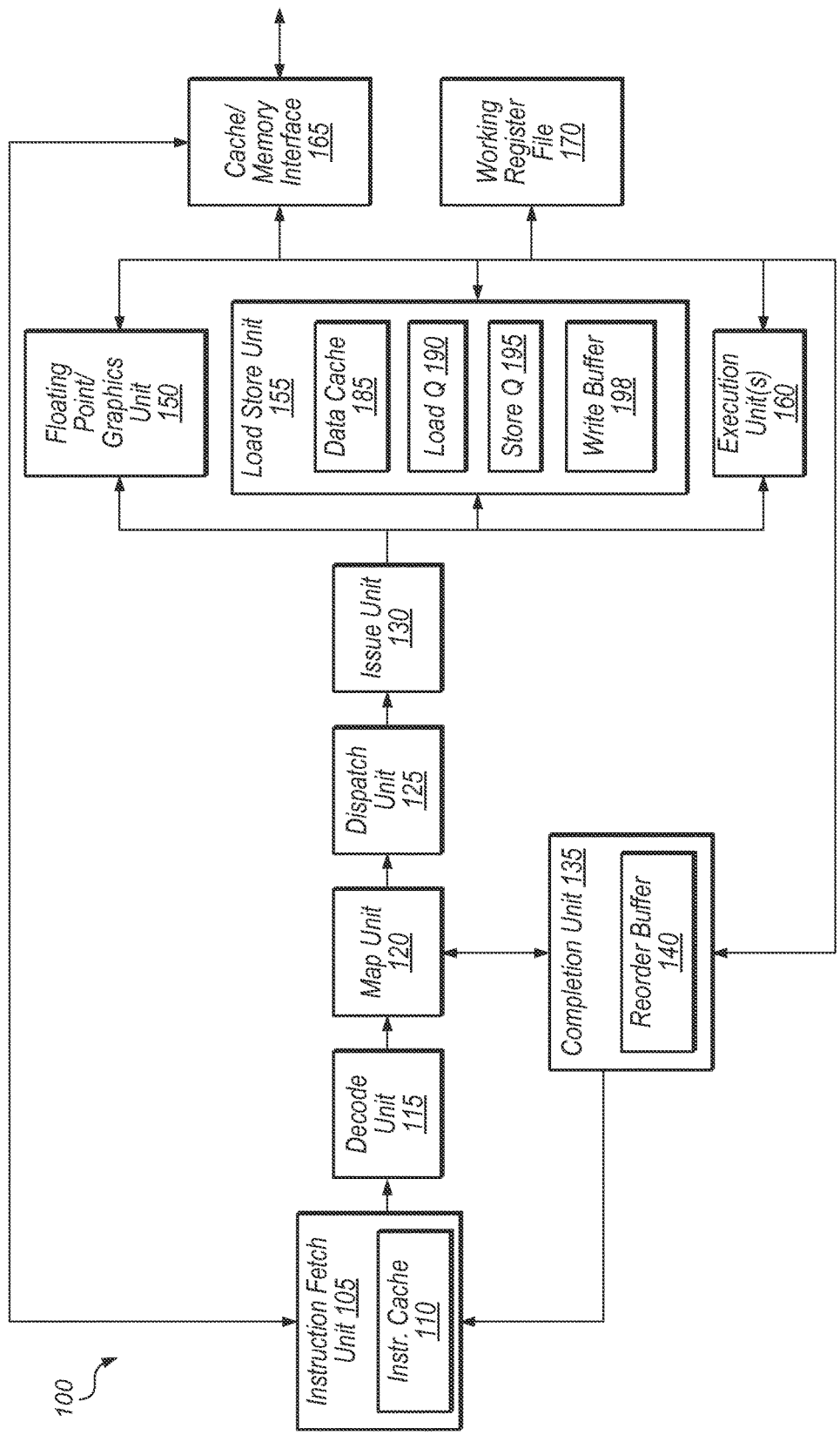
FIG. 1 is a block diagram illustrating one embodiment of a processor.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor . . . ." Such a claim does not foreclose the system from including additional components (e.g., a display, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of a processor 100 is shown. Processor 100 includes instruction fetch unit (IFU) 105 which includes an instruction cache 110. IFU 105 is coupled to various processing components that embody an instruction processing pipeline that begins with a decode unit 115 and proceeds in turn through map unit 120, dispatch unit 125, and issue unit 130. The issue unit 130 is coupled to instruction execution resources including the execution unit(s) 160, the load/store unit (LSU) 155, and the floating-point/graphics unit (FGU) 150. These instruction execution resources are also coupled to the working register file 170. Additionally, LSU 155 is coupled to cache/memory interface 165. Completion unit 135 is coupled to IFU 105, map unit 120, working register file 170, and the outputs of any number of the instruction execution resources. It is noted that the components shown in FIG. 1 are only one implementation of a processor, and that it is contemplated that in other embodiments, some components may be omitted and other components may be added. Thus, alternative configurations and variations are possible and contemplated.

The IFU 105 may be configured to provide instructions to the rest of the pipeline components for execution. In one embodiment, the IFU 105 may be configured to fetch instructions from an instruction cache 110 and to buffer those instructions for downstream processing, request data from a cache or memory through the cache/memory interface 165 in response to instruction cache misses, and predict the direction and target of control transfer instructions (e.g., branches).

It is noted that the concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a store instruction refers to retrieving the value of the store's target location, which may, in some embodiments, be accomplished by a circuit at an execute stage of a pipeline (e.g., by a load/store unit). Conversely, "executing" the store instruction may refer to the entirety of operations that occur throughout the pipeline as a result of the store instruction. Instructions may be speculatively executed, and may be flushed and replayed or retried if one or more conditions are not as speculated. In addition, the speculatively executed instructions may be held while waiting for the conditions to be fulfilled.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the target by forwarding the data from the store without accessing a cache or memory. In this example situation the load and the store both target the same target location (e.g., using the same memory address), but do not use the same storage element to access the target location. Further, an instruction may "target" a cache line when it targets a location in the cache line. Also, snoops typically target a cache on a cache-line basis.

In one embodiment, the decode unit 115 may be configured to prepare fetched instructions for further processing. The decode unit 115 may be configured to identify the particular nature of an instruction (e.g., as specified by its opcode) and to determine the source and destination registers encoded in an instruction, if any. In some embodiments, the decode unit 115 may be configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" or "no-operation" instruction or a conditional instruction for which the condition is false. An instruction may be defined by a given instruction set architecture (ISA). An instruction may also be defined by a microarchitecture rather than tied to a particular ISA. For example, the decode unit 115 may be configured to decode an ISA instruction into one or more micro-operations, which may also be referred to as "instructions" when they specify an operation to be performed by a processor pipeline. Thus, a "store instruction" may or may not be defined by an ISA. A store instruction includes information indicative that a store operation is to be performed and typically includes information indicating a store's target memory location.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Register renaming may facilitate the elimination of certain dependencies between instructions (e.g., write-after-read or "false" dependencies), which may in turn prevent unnecessary serialization of instruction execution. In one embodiment, map unit 120 may be configured to rename the architectural destination registers specified by instructions of a particular ISA by mapping them to a physical register space, resolving false dependencies in the process.

Once decoded and renamed, instructions may be ready to be scheduled for performance. In the illustrated embodiment, the dispatch unit 125 may be configured to schedule (i.e., dispatch) instructions that are ready for performance and to send the instructions to issue unit 130. In one embodiment, the dispatch unit 125 may be configured to maintain a schedule queue that stores a number of decoded and renamed instructions as well as information about the relative age and status of the stored instructions. For example, taking instruction dependency and age information into account, dispatch unit 125 may be configured to pick one or more instructions that are ready for performance.

The issue unit 130 may be configured to provide instruction sources and data to the various execution units for picked (i.e., scheduled or dispatched) instructions. In one embodiment, the issue unit 130 may include reservation stations for storing instructions while waiting for their operands and/or for other processing resources to become available. In other embodiments, the issue unit 130 may provide instructions to reservation stations distributed among FGU 150, LSU 155, execution unit(s) 160, etc. Results may also be sourced from register files representing architectural (i.e., user-visible) as well as non-architectural state. In the illustrated embodiment, processor 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 may be similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units.

The LSU 155 may be configured to receive instruction information from the instruction processing pipeline (of which LSU 155 may be considered a part) and is coupled to a higher-level cache (relative to data cache 185) and/or a memory. Further, LSU 155 may be configured to process data memory references, such as integer and floating-point load and store instructions and other types of memory reference instructions. In the illustrated embodiment, the LSU 155 includes data cache 185, load queue 190, store queue 195, and write buffer 198. The LSU 155 may be configured to detect misses in the data cache 185 (which may be a level 1 data cache for example) and to responsively request data from a cache or memory through cache/memory interface 165.

In some embodiments, load queue 190 and store queue 195 are respectively configured to queue load and store instructions until their results can be committed to the architectural state of the processor. Instructions in the queues may be speculatively performed, non-speculatively performed, or waiting to be performed. Each queue may include a plurality of entries, which may store loads/stores in program order. However, load and store instructions may be executed out of program order earlier in the processing pipeline. As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

In one embodiment, the load queue 190 may be configured to store information associated with load instructions. More particularly, each entry in load queue 190 may include address information corresponding to the target location of a load, data associated with the load, and status information such as whether or not a store operation to the same target address has been received, for example. Similarly, store queue 195 may be configured to store information associated with store instructions. More particularly, each entry in store queue 195 may include address information corresponding to the target location of a store, data associated with the store, and status information. In other embodiments, the load and store queues may be combined into a single load/store queue.

In one embodiment, stores from store queue 195 may be moved to write buffer 198 at the point the stores become non-speculative, irrespective of their cache status (hit or miss). This allows younger stores from reservation stations to re-use the same entry in store queue 195. In various embodiments, write buffer 198 may be configured to keep store data for both cache hits and misses to be written to data cache 185. Stores that are hits to data cache 185 may drain right away to data cache 185. Stores that are misses may need to wait in write buffer 198 for an arbitrary number of cycles for the fill to be received from a higher order cache or memory. Once the fill is received, the stores that were earlier misses will become cache hits and drain to data cache 185. Write buffer 198 allows for younger stores that are cache hits to commit (i.e., write to data cache 185) in the presence of older stores that may be cache misses.

In one embodiment, the LSU 155 may attempt to speculatively perform loads as soon as they arrive. However, the LSU 155 may retry speculatively-executed loads based on older conflicting stores and cache line migrations, for example. In some embodiments, LSU 155 may not speculatively execute loads when particular conditions persist when the loads arrive at LSU 155. Such loads may reside in load queue 190 while waiting to be performed.

As used herein, the term "conflict" refers to a situation in which memory access instructions target the same memory location in a particular order. For example, if LD_C and ST_A target the same location with ST_A being earlier in program order than LD_C, and LD_C arrives at LSU 155 before ST_A, we describe LD_C as conflicting with ST_A. In one embodiment LSU 155 would speculatively perform LD_C and then replay LD_C when ST_A arrives. In another embodiment, LSU 155 would wait to perform LD_C until ST_A arrives. This situation may be referred to as a "read after write" hazard. Other types of conflicts/hazards include "write after read" and "write after write."

In various embodiments, LSU 155 may implement a variety of structures configured to facilitate memory operations. For example, LSU 155 may implement a data translation lookaside buffer (TLB) to cache virtual data address translations. LSU 155 may also include hardware configured to support atomic load-store instructions, memory-related exception detection, read and write access to special-purpose registers (e.g., control registers), and detect memory ordering violations responsive to snoop operations, for example.

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In the illustrated embodiment, completion unit 135 includes a reorder buffer (ROB) 140. The completion unit may be configured to coordinate transfer of speculative results into the architectural state of processor 100. Entries in ROB 140 may be allocated in program order. The completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as ready to complete (or "retire") when their results are allowed to be written to the architectural state. The completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying" or "retrying" as used herein, refers to re-performing a speculatively-performed or waiting instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

In one embodiment, completion unit 135 is configured to retire/remove a store instruction from ROB 140 and post it to store queue 195 before the store instruction has actually written its store-data. This may improve processing speed by allowing other instructions to retire instead of waiting for the store to complete. Stores may often complete slowly since they may wait for a write to a cache or memory and may require coherency procedures. Posted store instructions may reside in store queue 195 until they have actually written their results (after completion unit 135 has determined that the store instructions have not caused any exceptions and dependencies are resolved). Thus, posted store instructions may not be considered completed until they are removed from store queue 195.

In order to detect conflicts, each entry in load queue 190 and store queue 195 may include an address of its target location. At least a portion of the address field may be implemented using content addressable memory (CAM). Thus, LSU 155 may provide a load's target address to the CAM fields of older stores in store queue 195 to determine whether any older stores to the same location reside in store queue 195. In some situations, a younger load may arrive at load queue 190 when older stores have not yet arrived at store queue 195. In this situation, in some embodiments, LSU 155 may speculatively execute the younger load but may not allow it to retire until all older stores have reached store queue 195 so that the younger load can be checked for dependencies.

Memory ordering is a common memory system requirement. For example, loads to the same memory address must be ordered with respect to each other, such that a younger load instruction never reads an "older" value of data from a given memory address when an older load to the same address reads a "newer" value. Likewise load-store operations must be ordered to enforce read after write rules to prevent a younger read to a target address from speculatively executing before an older write to the target address has occurred.

As used herein, the terms "older" and "younger" refer to relative ages of instructions in an instruction stream. Said another way, older instructions precede younger instructions in program order. For example, in instruction stream 205 of FIG. 2, ST_B is older than ST_C but younger than ST_A. Further, "older" data refers to data associated with a relatively older instruction while "newer" data refers to data associated with a relatively younger instruction. For example, an older store may be described as having written old data to a particular location when a younger store writes new data to the particular location.

Modern microprocessors often include multiple levels of caches, as well as circuitry configured to maintain coherence among these distributed caches. Often, a processor core uses a "snoop" mechanism to enforce coherency. Snoops are requests sent from a requesting cache to a target cache to invalidate or evict a cache line from the target cache so that the requesting cache can write the cache line. In some embodiments, a snoop may indicate whether the cache line should be invalidated or evicted. A processor may be configured to replay speculatively-executed loads from migrated cache lines. Similarly, if one processor or core writes to a memory location shared by other processors, that processor may send out a snoop to all other caches (and processors) to allow any speculatively executed load operations to the same address to be flushed and retried if there is an ordering violation.

Figure 2:
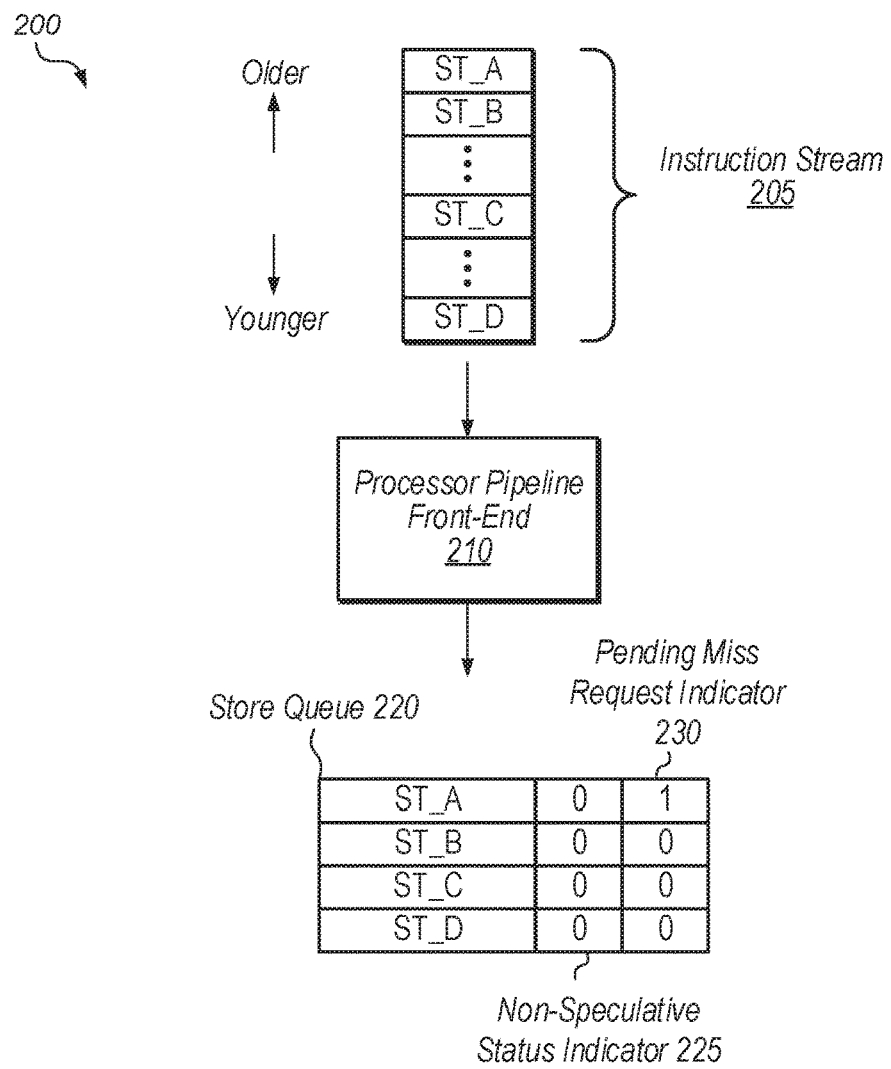
FIG. 2 is a block diagram of one embodiment of a system which includes a store queue.

Turning now to FIG. 2, a block diagram of one embodiment of a system 200 which includes a store queue is shown. In the illustrated embodiment, system 200 may include at least one processor which is configured to execute instructions of instruction stream 205. Depending on the embodiment, system 200 may be a smartphone, tablet, laptop computer, desktop computer, watch, server, programmable consumer electronic device, set-top box, television, satellite receiver, or other electronic device or computing system.

Stores and other instructions of instruction stream 205 may arrive in program order at processor pipeline front-end 210. Processor pipeline front-end 210 may be configured to speculatively execute stores and other instruction of instruction stream 205. Processor pipeline front-end 210 may include a fetch unit, decode unit, map unit, issue unit, and reservation station(s). Store instructions may be stored in store queue 220 to await non-speculative status, at which point these store instructions may be committed to the architectural state of system 200.

As shown in instruction stream 205, ST_A is the oldest store instruction, with ST_B younger than ST_A, with ST_C younger than ST_B, and ST_D younger than ST_C. It is noted that instruction stream 205 may include any number of other instructions which may be issued to other execution units and/or storage elements (e.g., a load queue). Each entry of store queue 220 may include a status indicator 225 which indicates if the store is speculative or is non-speculative. In one embodiment, a store that begins as speculative may reach non-speculative status when one or more conditions are satisfied. Such conditions may include all older stores to the same address are complete, all older loads are complete, all older barrier instructions are complete, and/or all older branches are resolved. In other embodiments, reaching non-speculative status may include other conditions. Each entry of store queue 220 may also include pending miss request indicator 230 which indicates if the store was a cache miss and if the store is waiting on a fill. Each entry of store queue 220 may also include any number of other fields associated with the store. While store queue 220 is shown as having four entries in FIG. 2, this is merely for illustrative purposes, and it should be understood that a store queue may have any number of entries, depending on the embodiment.

In one embodiment, if the non-speculative status indicator 225 is '1' for a given entry, this indicates that none of the older instructions in the pipeline can cause this instruction to be flushed from the processor. As shown in store queue 220, all entries have their non-speculative status indicator 225 set to '0' and are waiting to reach non-speculative status. Also, if the pending miss request indicator 230 is '0' for a given entry, this indicates that the target of the store is available in the cache. Accordingly, if the non-speculative status indicator 225 is '1' for a given entry and the pending miss request indicator 230 is '0' for a given entry, the corresponding store instruction is ready to be committed to the memory hierarchy of the system 200. As shown in store queue 220, the entry for ST_A has its pending miss request indicator 230 set to '1' which indicates ST_A is a cache miss and is waiting for the miss request to come back from memory or the next level cache.

Figure 3:
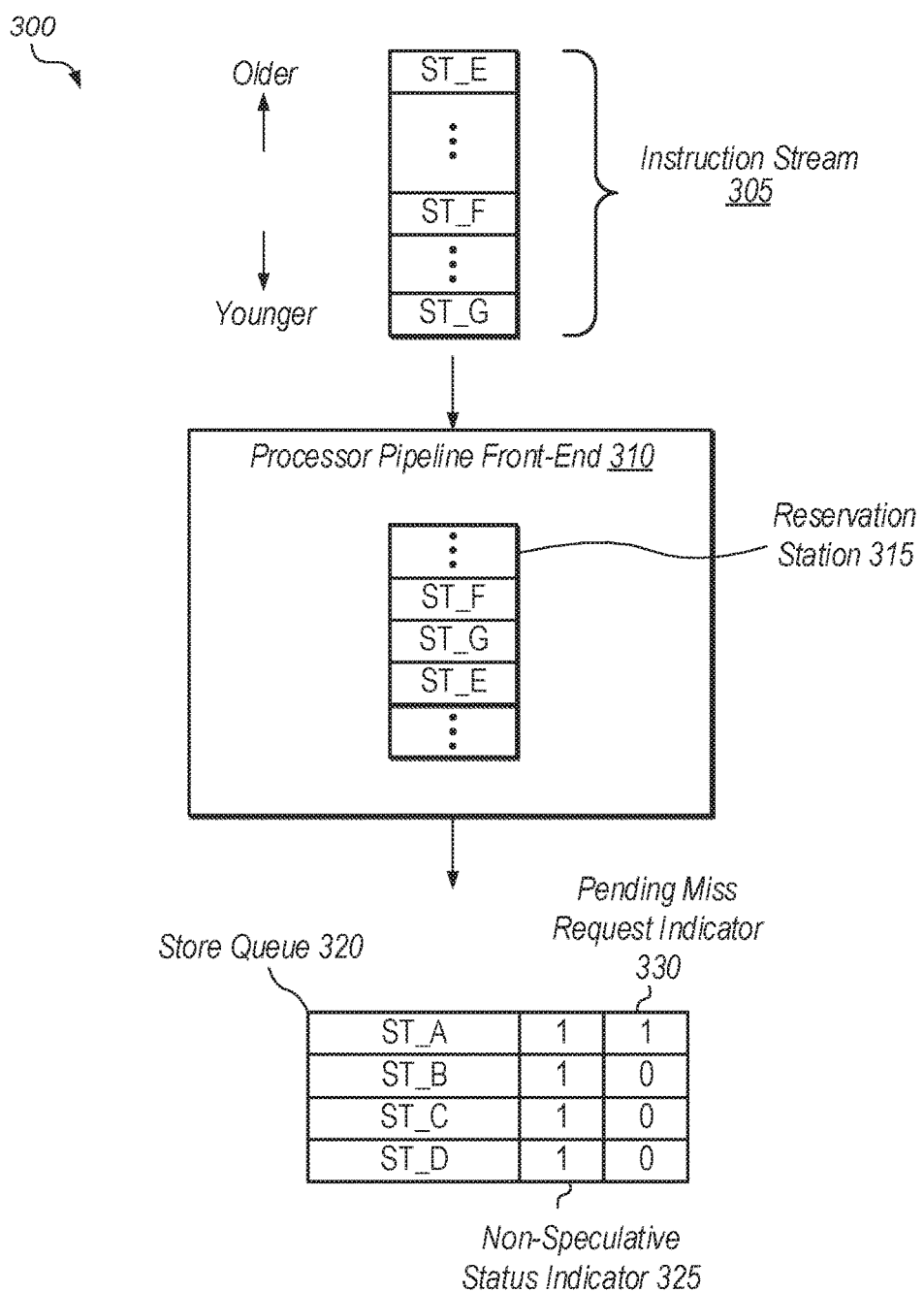
FIG. 3 is a block diagram of another embodiment of a system which includes a store queue.

Referring now to FIG. 3, a block diagram of another embodiment of system 300 which includes a store queue is shown. System 300 is intended to represent system 200 (of FIG. 2) at a later point in time. Also, processor pipeline front-end 310 and store queue 320 shown in system 300 are intended to represent processor pipeline front-end 210 and store queue 220, respectively, of system 200 at a later point in time. Instruction stream 305 includes new instructions (e.g., ST_E, ST_F, and ST_G) ready to be processed by system 300.

As shown in instruction stream 305, ST E is the oldest store instruction within instruction stream 305, with ST_F the next oldest store instruction, and with ST_G the youngest of the three store instructions in instruction stream 305. It is noted that instruction stream 305 may also include any number of other instructions. Processor pipeline front-end 310 may fetch, decode, map, and issue ST_E, ST_F, and ST_G to reservation station 315. It is noted that reservation station 315 is representative of any number of reservation stations, and that the three stores (ST_E, ST_F, and ST_G) may be stored in separate reservation stations in some embodiments.

Store queue 320 may still include the four earlier stores (ST_A, ST_B, ST_C, and ST_D). It may be assumed for the purposes of this discussion that store queue 320 is currently full as shown in FIG. 3. Accordingly, the three stores (ST_E, ST_F, and ST_G) in reservation station 315 may be waiting to be stored in store queue 320 when any of its entries are dequeued. However, the oldest store (ST_A) is currently waiting for a miss request to be completed, and so a stall condition exists as shown in FIG. 3. However, the three other stores (ST_B, ST_C, and ST_D) were cache hits (as indicated by their pending miss request indicators 330) and have reached non-speculative status (as indicated by their non-speculative status indicators 325). Accordingly, the three stores (ST_B, ST_C, and ST_D) may be committed out of order to the memory hierarchy which will allow their entries to be dequeued from store queue 320. This will allow for more stores to be issued from reservation station 315 to store queue 320, resulting in improved processor performance.

Figure 4:
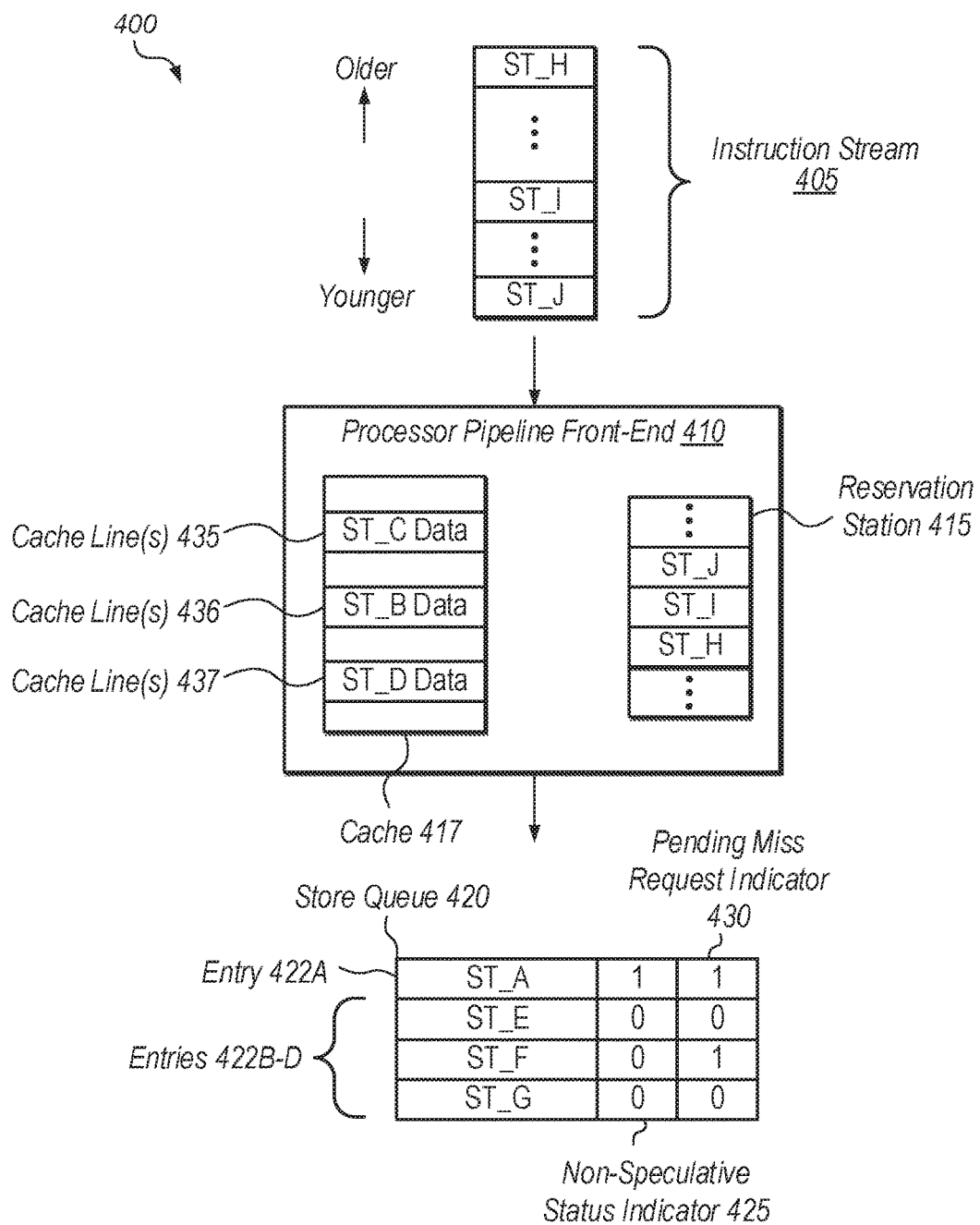
FIG. 4 is a block diagram of another embodiment of a system which includes a store queue.

Turning now to FIG. 4, a block diagram of another embodiment of system 400 which includes a store queue is shown. System 400 is intended to represent system 300 (of FIG. 3) at a later point in time. Also, processor pipeline front-end 410 and store queue 420 shown in system 400 are intended to represent processor pipeline front-end 310 and store queue 320, respectively, of system 300 at a later point in time.

Instruction stream 405 may include a new batch of instructions being processed, with these instructions including three store instructions ST_H, ST_I, and ST_J. Processor pipeline front-end 410 may fetch, decode, map, and issue these store instructions to reservation station 415. Reservation station 415 is representative of any number of reservation stations. Meanwhile, the entries 422B-D of store queue 420 may have been filled by the store instructions ST_G, ST_E, and ST_F, respectively. These entries 422B-D were previously used to hold store instructions ST_B, ST_C, and ST_D, respectively, with ST_B, ST_C, and ST_D having been committed to the memory hierarchy of system 400 and dequeued from store queue 420. Accordingly, the data corresponding to store instructions ST_B, ST_C, and ST_D may be stored in cache lines 436, 435, and 437, respectively. It is noted that in another embodiment, stores ST_B, ST_C, and ST_D may be moved to a write buffer (not shown) from store queue 420 prior to having their data written to cache 417. The write buffer will be described in more detail in the discussion associated with FIGS. 7-9. By committing and dequeueing entries 422B-D out of order while the older store instruction ST_A remains in entry 422A, the processor is able to continue issuing instructions from reservation station 415 to store queue 420 and prevent instruction processing from stalling.

Figure 5:
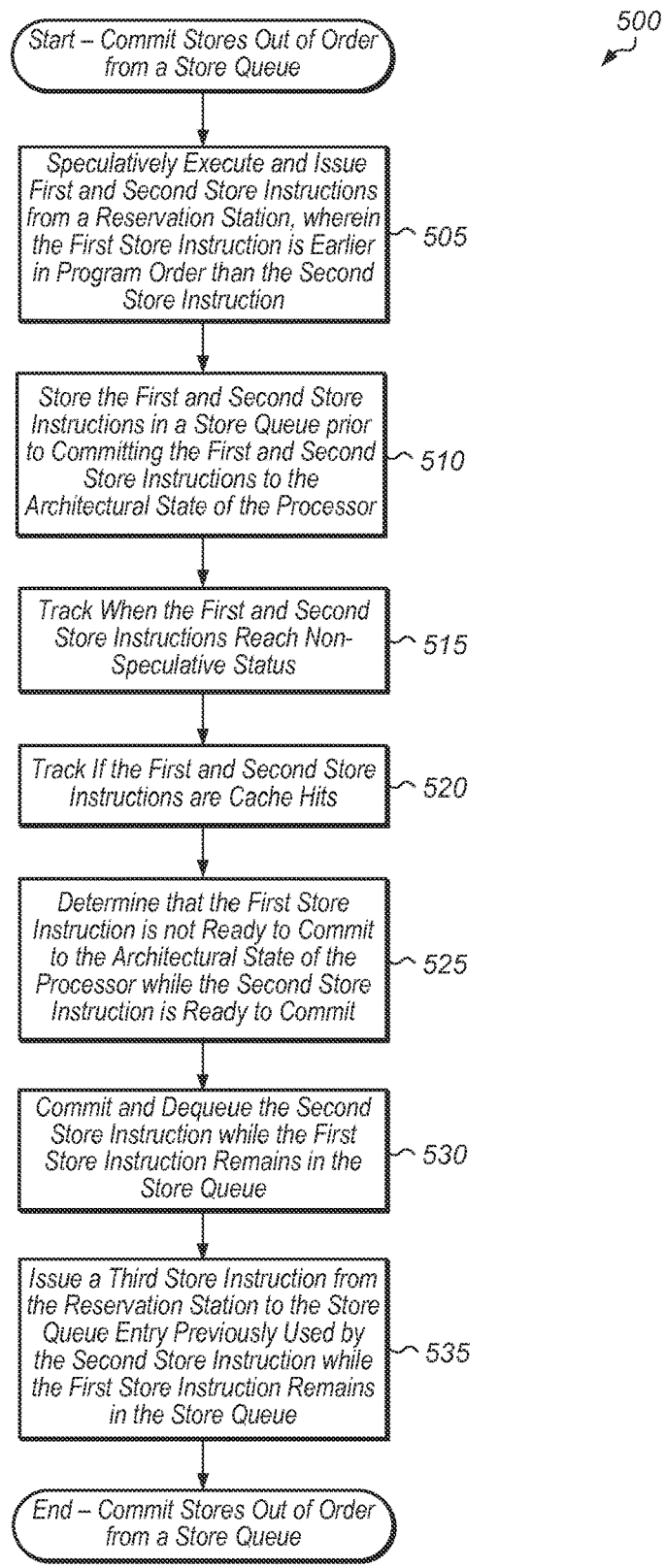
FIG. 5 is a generalized flow diagram illustrating one embodiment of a method for committing stores out of order from a store queue.

Referring now to FIG. 5, one embodiment of a method 500 for committing stores out of order from a store queue is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 500.

A processor may speculatively execute and issue a first store instruction and a second store instruction from a reservation station, wherein the first store instruction is earlier in program order than the second store instruction (block 505). In various embodiments, the processor may be included within a host device, wherein the host device is a smartphone, tablet, laptop computer, desktop computer, watch, server, programmable consumer electronic device, set-top box, television, satellite receiver, or other electronic device or computing system. Prior to committing the first store instruction and the second store instruction to the architectural state of the processor, the processor may store the first store instruction and the second store instruction in a store queue (block 510). The processor may track when the first and second store instructions reach non-speculative status (block 515). In one embodiment, a store instruction may reach a non-speculative state when all older stores to the same address are complete, all older loads are complete, all older barrier instructions are complete, and all older branches are resolved. The processor may also track if the first and second store instructions are cache hits (block 520).

The processor may determine that the first store instruction is not ready to commit to the architectural state of the processor while the second store instruction is ready to commit (block 525). In one embodiment, the first store instruction may be a cache miss and may be waiting on a fill to come back from memory or the next level cache while the second store instruction is a cache hit. In response to determining that the first store instruction is not ready to commit to the architectural state of the processor while the second store instruction is ready to commit, the processor may commit and dequeue the second store instruction while the first store instruction remains in the store queue (block 530). In another embodiment, the first store instruction may be moved to a write buffer while maintaining its pending miss status. In this embodiment, the first store instruction may be dequeued from the store queue after it has been moved to the write buffer. This embodiment will be described in further detail during the discussion regarding FIGS. 7-9. Next, the processor may issue a third store instruction from the reservation station to the store queue entry previously used by the second store instruction while the first store instruction remains in the store queue (block 535). After block 535, method 500 may end.

Figure 6:
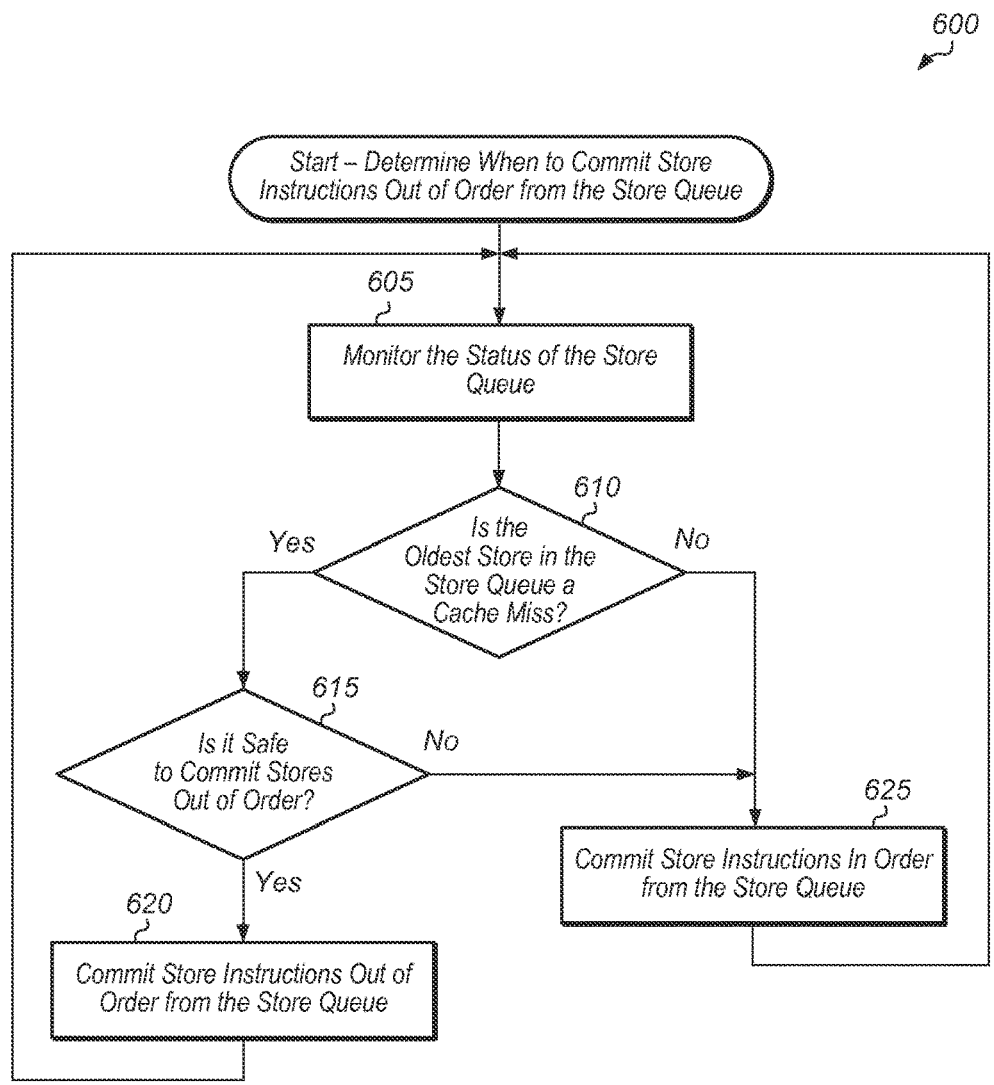
FIG. 6 is a generalized flow diagram illustrating one embodiment of a method for determining when to commit stores out of order from a store queue.

Referring now to FIG. 6, another embodiment of a method 600 for determining when to commit stores out of order from the store queue is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various systems and/or apparatuses described herein may be configured to implement method 600.

A processor may monitor the status of a store queue (block 605). In various embodiments, the processor may be included within a host device, wherein the host device is a smartphone, tablet, laptop computer, desktop computer, watch, server, programmable consumer electronic device, set-top box, television, satellite receiver, or other electronic device or computing system. The store queue may be configured to queue store instructions until their results can be committed to the architectural state of the processor. In one embodiment, monitoring the status of the store queue may comprise determining if the oldest store instruction in the store queue is a cache miss. If the oldest store instruction in the store queue is a cache miss, this oldest store instruction may wait for a long time for the fill to come back from memory. This could potentially cause the processor to stall if younger store instructions are waiting for the oldest store instruction to commit.

If the oldest store instruction in the store queue is a cache miss (conditional block 610, "yes" leg), then the processor may determine if it is safe to commit store instructions out of order from the store queue (conditional block 615). In one embodiment, the processor may determine it is safe to commit a given store instruction out of order if all store instructions older than the given store instruction have passed the point at which they could be flushed from the processor. If it is safe to commit store instructions out of order from the store queue (conditional block 615, "yes" leg), then the processor may commit store instructions out of order from the store queue (block 620). For example, one or more younger store instructions may be cache hits while one or more older store instructions may be cache misses, which may cause the younger store instructions to be stuck in the store queue. Accordingly, in block 620, the processor may commit the younger store instructions when they are ready to commit to the memory hierarchy while the older store instructions are still waiting on their fills to come back from memory.

If the oldest store instruction in the store queue is a cache hit (conditional block 610, "no" leg), then the processor may commit store instructions in order from the store queue (block 625). Also, if it is not safe to commit store instructions out of order from the store queue (conditional block 615, "no" leg), then the processor may commit store instructions in order from the store queue (block 625). After blocks 620 and 625, method 600 may return to block 605 with the processor continuing to monitor the status of the store queue.

Figure 7:
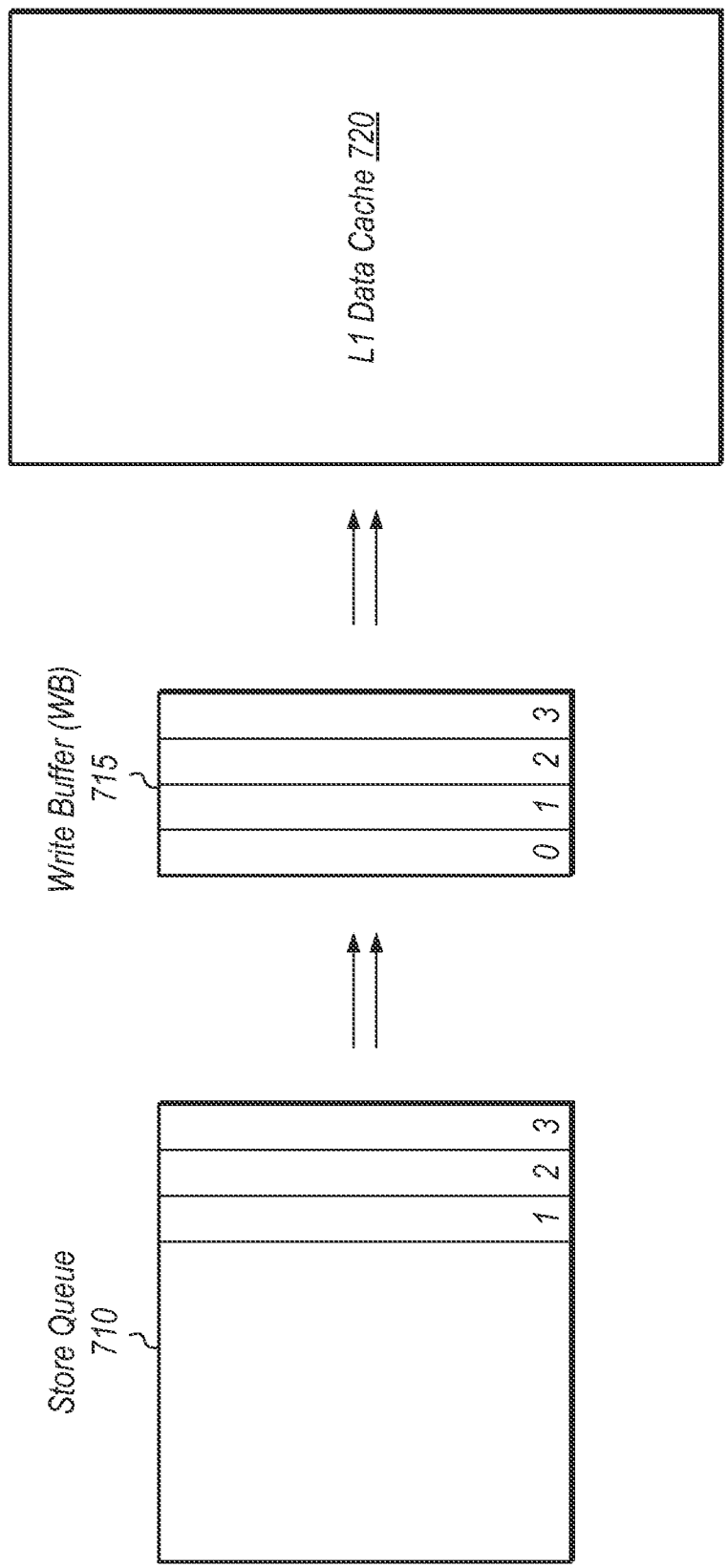
FIG. 7 is a block diagram of one embodiment of a processor data path flow for store instructions.

Referring now to FIG. 7, a block diagram of one embodiment of a processor data path flow for store instructions is shown. When a given store instruction stored in store queue 710 becomes non-speculative, the given store instruction may be moved to write buffer (WB) 715, irrespective of the cache status (hit or miss) of the given store instruction. This allows younger store instructions from the reservation stations (not shown) to re-use the same entry of store queue 710.

In one embodiment, WB 715 may be configured to keep store data for both cache hits and cache misses to be written to level one (L1) data cache 720. Stores that are hits in L1 data cache 720 may drain immediately to L1 data cache 720. Stores that are cache misses may need to wait in WB 715 for an arbitrary number of cycles for the fill to be received from higher order caches or memory. Once the fill is received, the store misses will become hits and drain to L1 data cache 720.

In various embodiments, WB 715 may also be configured to forward data from stores that have not yet written to L1 data cache 720 to younger loads. WB 715 may also be configured to merge stores that match against a fill address from a next-level cache and write the store data to L1 data cache 720. WB 715 may further be configured to provide eviction/snoop data to a next-level cache in case the snoop/fill address matches against resident entries of WB 715. Depending on the micro-architecture and design constraints (e.g., timing, area), it is possible for WB 715 to have multiple entries with the same address. In the case of a snoop, for matches against multiple entries, WB 715 may merge data across various stores and send it out to the next-level cache.

In one embodiment, WB 715 may allow for younger stores that are hits in L1 data cache 720 to commit (i.e., write to L1 data cache 720) in the presence of older stores that may be misses to L1 data cache 720. The efficiency of a system that commits out-of-order stores may be measured by: (1) how many younger stores that are cache hits can be written to the cache in the presence of an older store waiting for a fill and (2) how many store misses can be queued by WB 715. While WB 715 is shown as having 4 entries in FIG. 7, it should be understood that this is indicative of a single embodiment. In other embodiments, WB 715 may have other numbers of entries. Generally speaking, WB 715 may have 'N' entries, wherein 'N' is any positive integer. For a WB 715 of size 'N', one implementation may allow for: (1) an infinite number of younger stores to be enqueued and later drained to the cache (on a hit) in the presence of an older store that is waiting for a fill, and (2) a maximum of 'N' stores that can be waiting for a miss in WB 715.

In one embodiment, WB 715 may be configured to re-request a cache line responsive to determining a fill has come back from the higher order cache or memory with an error. When a given store instruction that is a miss on L1 data cache 720 is moved to WB 715 from store queue 710, the entry corresponding to the given store instruction in store queue 710 may be deallocated. Accordingly, when the fill comes back from the higher level cache or memory with one or more errors, WB 715 may generate a request for the cache line to be resent.

Figure 8:
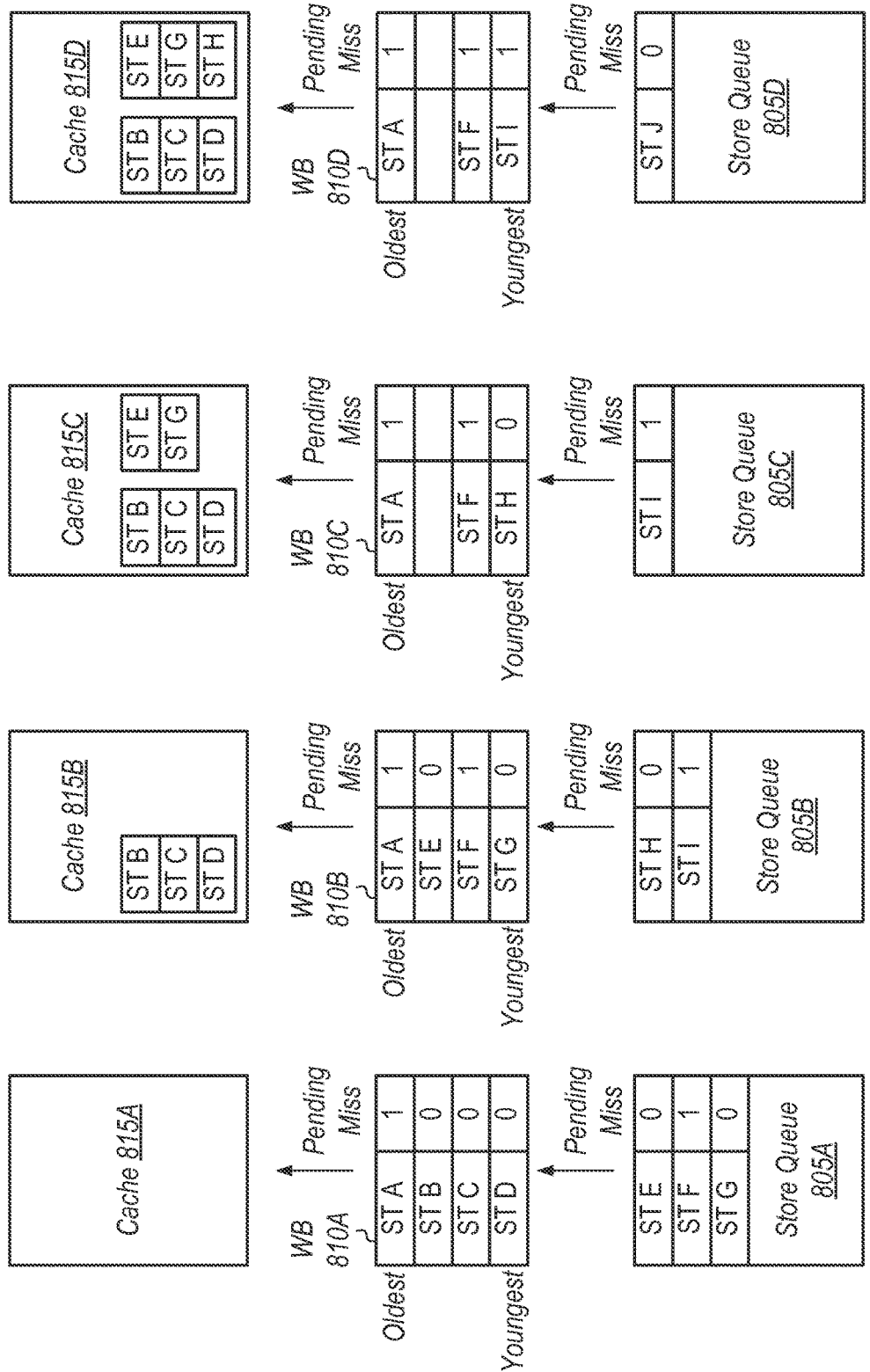
FIG. 8 illustrates block diagrams of a WB at four different points in time.

Turning now to FIG. 8, block diagrams of a WB at four different points in time are shown. In one embodiment, WB 810A may keep accepting stores from the store queue 805A as long as the oldest and the youngest stores in WB 810A are not both waiting for a fill from the next-level cache (or memory). Every cycle, WB 810A may scan the entries from oldest to youngest and drain to the cache any store that does not have a pending miss. In one embodiment, WB 810A may be implemented as a circular queue. New stores from store queue 805A may keep enqueuing at the tail end of the circular queue as long as there is space for a new store. Additionally, WB 810A may allow for fast CAM/forwarding of data to younger loads, which may be achieved by ensuring that the oldest to youngest store entries in WB 810A are in circular order.

Store queue 805A, WB 810A, and cache 815A are intended to represent a portion of a processor pipeline at a first point in time, store queue 805B, WB 810B, and cache 815B are intended to represent the portion of the processor pipeline at a second point in time (subsequent to the first point in time), store queue 805C, WB 810C, and cache 815C are intended to represent the portion of the processor pipeline at a third point in time (subsequent to the second point in time), and store queue 805D, WB 810D, and cache 815D are intended to represent the portion of the processor pipeline at a fourth point in time (subsequent to the third point in time).

As shown in WB 810A, store instruction A (ST A) is a cache miss while store instructions B, C, and D (ST B, ST C, and ST D) are cache hits. Accordingly, ST B, ST C, and ST D may be drained to cache 815B in a subsequent clock cycle (corresponding to the second point in time). When ST B, ST C, and ST D are drained to cache 815B, ST E, ST F, AND ST G may be moved from store queue 805A to WB 810B to the entries previously utilized by ST B, ST C, and ST D, respectively. For the purposes of this discussion, it may be assumed that ST F is a cache miss, and so ST F may remain in WB 810C while ST E and ST G are drained to cache 815C. ST H may also be moved to WB 810C to the entry previously used by ST G, which maintains the proper order from oldest to youngest in the entries of WB 810C. Since ST H is a cache hit, ST H may be drained to cache 815D while ST I is moved to WB 810D to the entry previously used by ST H. At the point in time shown for WB 810D, no more stores from store queue 805D can write to WB 810D until either ST A or ST I gets a fill from the next level cache or memory and gets dequeued. In WB 810D, both the youngest store instruction and the oldest store instruction are cache misses. Accordingly, new stores may be prevented from being moved from store queue 805D to WB 810D in response to detecting that both the youngest store instruction and the oldest store instruction are cache misses. This is in spite of WB 810D having a free entry available as shown in FIG. 8. This prevention of new stores being moved from store queue 805D to WB 810D (when the youngest and oldest store instructions stored in WB 810D are misses) is intended to maintain the circular queue structure of WB 810D.

Figure 9:
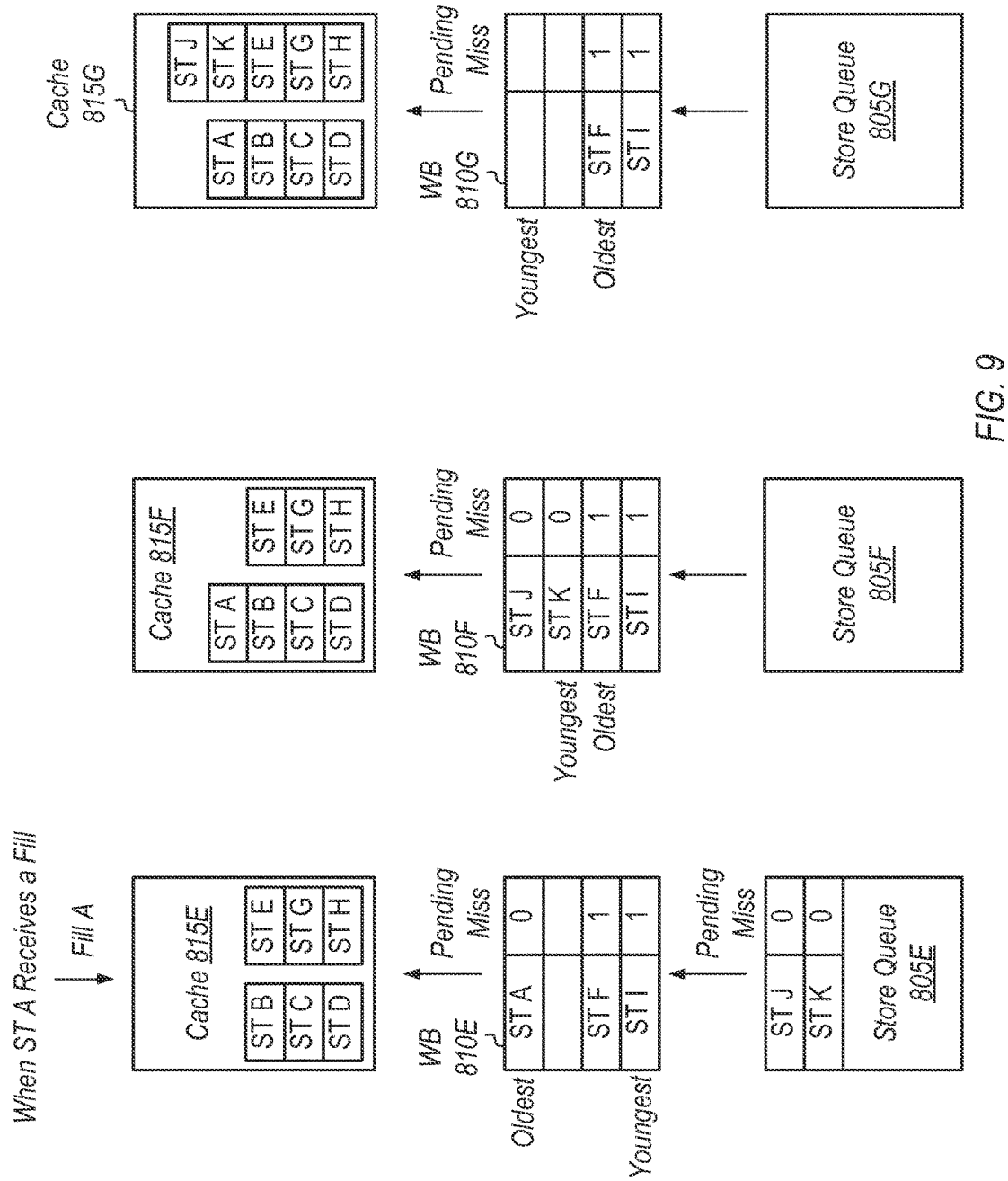
FIG. 9 illustrates block diagrams of a WB at three different points in time.

Referring now to FIG. 9, block diagrams of a WB at three different points in time are shown. Store queue 805E, WB 810E, and cache 815E are intended to represent the portion of the processor pipeline at a fifth point in time (subsequent to the fourth point in time shown in FIG. 8), store queue 805F, WB 810F, and cache 815F are intended to represent the portion of the processor pipeline at a sixth point in time (subsequent to the fifth point in time), and store queue 805G, WB 810G, and cache 815G are intended to represent the portion of the processor pipeline at a seventh point in time (subsequent to the sixth point in time).

It may be assumed for the purposes of this discussion that the fill has come back for ST A at the fifth point in time. Accordingly, the entry in WB 810E for ST A indicates that ST A is no longer a pending miss. Therefore, ST A may be drained to cache 815F and ST J and ST K may be moved from store queue 805E to WB 810F now that there are entries available in WB 810F that can preserve the proper ordering of store instructions. In WB 810F, the oldest store instruction is ST F and the youngest store instruction is ST K. Since ST J and ST K are cache hits, these stores can be drained immediately to cache 815G, leaving two free entries in WB 810G while the older stores ST F and ST I are still waiting for their fills to come back.

Figure 10:
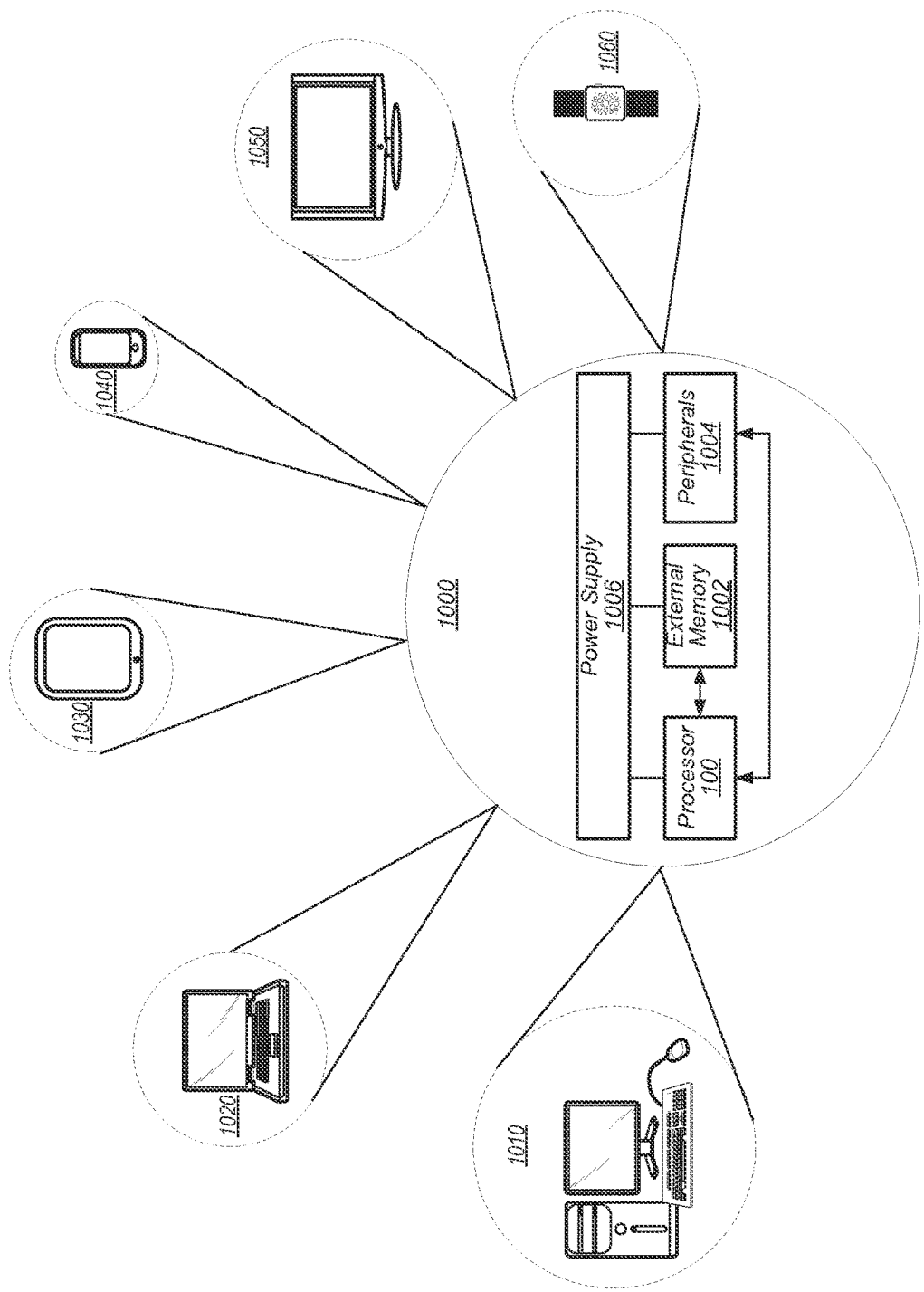
FIG. 10 is a block diagram of one embodiment of a system.

Referring next to FIG. 10, a block diagram of one embodiment of a system 1000 is shown. As shown, system 1000 may represent chip, circuitry, components, etc., of a desktop computer 1010, laptop computer 1020, tablet computer 1030, cell or mobile phone 1040, television 1050 (or set top box configured to be coupled to a television), wrist watch or other wearable item 1060, or otherwise. Other devices are possible and are contemplated. In the illustrated embodiment, the system 1000 includes at least one instance of processor 100 (of FIG. 1) coupled to an external memory 1002. In various embodiments, processor 100 may be included within a system on chip (SoC) or integrated circuit (IC) which is coupled to external memory 1002, peripherals 1004, and power supply 1006.

Processor 100 is coupled to one or more peripherals 1004 and the external memory 1002. A power supply 1006 is also provided which supplies the supply voltages to processor 100 as well as one or more supply voltages to the memory 1002 and/or the peripherals 1004. In various embodiments, power supply 1006 may represent a battery (e.g., a rechargeable battery in a smart phone, laptop or tablet computer). In some embodiments, more than one instance of processor 100 may be included (and more than one external memory 1002 may be included as well).

The memory 1002 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an SoC or IC containing processor 100 in a chip-on-chip configuration, a package-on-package configuration, or a multi-chip module configuration.

The peripherals 1004 may include any desired circuitry, depending on the type of system 1000. For example, in one embodiment, peripherals 1004 may include devices for various types of wireless communication, such as wifi, Bluetooth, cellular, global positioning system, etc. The peripherals 1004 may also include additional storage, including RAM storage, solid state storage, or disk storage. The peripherals 1004 may include user interface devices such as a display screen, including touch display screens or multitouch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache configured to store data retrieved from a memory;
   a store queue comprising a plurality of entries, wherein each entry stores:
      an identification of a store instruction;
      an indication as to whether the store instruction is speculative or non-speculative; and
      a pending miss request indicator which indicates, in response to a cache hit, that data targeted by the store instruction is available in a cache;
   wherein the processor is configured to:
      store a first store instruction in a first entry of the store queue; and
      store a second store instruction in a second entry of the store queue, wherein the first store instruction is older than the second store instruction; and
      in response to determining the second store instruction is ready to commit to a memory hierarchy:
         allow the second store instruction to commit before the first store instruction, in response to determining:
            an indication in the second entry indicates the second store instruction is non-speculative; and
            a pending miss indicator in the second entry indicates data targeted by the second instruction is available in the cache; and
         prevent the second store instruction from committing to the memory hierarchy before the first store instruction, in response to determining that at least one store instruction in the store queue older than the second store instruction is speculative.

2. The processor as recited in claim 1, wherein store instructions in the store queue that are speculative are subject to being flushed, and store instructions in the store queue that are non-speculative are not subject to being flushed.

3. The processor as recited in claim 1, wherein an indication in an entry of the store queue indicates a corresponding store instruction is non-speculative in response to a determination that all older stores to a same address as the store instruction are complete, all older loads are complete, all older barrier instructions are complete, and all older branch instructions are resolved.

4. The processor as recited in claim 1, wherein the processor is configured to:
move the first and second store instructions from the store queue to a write buffer when the first and second store instructions become non-speculative;
commit the second store instruction to a cache from the write buffer responsive to determining the second store instruction is a cache hit; and
delay committing the first store instruction to the cache from the write buffer responsive to determining the first store instruction is a cache miss.

5. The processor as recited in claim 4, wherein the processor is configured to prevent a non-speculative store instruction from moving from the store queue to the write buffer responsive to determining both a youngest entry and an oldest entry in the write buffer are cache misses.

6. The processor as recited in claim 4, wherein the write buffer is configured to request that a cache line be resent responsive to determining a corresponding fill has come back with an error.

7. A method for use in a processor comprising:
storing a first store instruction in a first entry of a store queue comprising a plurality of entries; and
storing a second store instruction in a second entry of the store queue of a processor,
wherein the first store instruction is older than the second store instruction,
wherein each entry of the store queue each entry stores:
an identification of a store instruction;
an indication as to whether the store instruction is speculative or non-speculative; and
a pending miss request indicator which indicates, in response to a cache hit, that data targeted by the store instruction is available in a cache;
in response to determining the second store instruction is ready to commit to a memory hierarchy:
allowing the second store instruction to commit before the first store instruction, in response to determining:
an indication in the second entry indicates the second store instruction is non-speculative; and
a pending miss indicator in the second entry indicates data targeted by the second instruction is available in the cache; and
preventing the second store instruction from committing to the memory hierarchy before the first store instruction, in response to determining that at least one store instruction in the store queue older than the second store instruction is speculative.

8. The method as recited in claim 7, wherein store instructions in the store queue that are speculative are subject to being flushed, and store instructions in the store queue that are non-speculative are not subject to being flushed.

9. The method as recited in claim 7, wherein an indication in an entry of the store queue indicates a corresponding store instruction is non-speculative in response to a determination that all older stores to a same address as the store instruction are complete, all older loads are complete, all older barrier instructions are complete, and all older branch instructions are resolved.

10. The method as recited in claim 7, further comprising:
moving the first and second store instructions from the store queue to a write buffer when the first and second store instructions become non-speculative;
committing the second store instruction to a cache from the write buffer responsive to determining the second store instruction is a cache hit; and
delaying committing the first store instruction to the cache from the write buffer responsive to determining the first store instruction is a cache miss.

11. The method as recited in claim 10, further comprising preventing a non-speculative store instruction from moving from the store queue to the write buffer responsive to determining both a youngest entry and an oldest entry in the write buffer are cache misses.

12. The method as recited in claim 10, further comprising requesting, by the write buffer, that a cache line be resent responsive to determining a corresponding fill has come back with an error.

13. A computing system comprising:
a memory; and
a processor comprising:
a cache configured to store data retrieved from the memory; and
a store queue comprising a plurality of entries, wherein each entry stores:
an identification of a store instruction;
an indication as to whether the store instruction is speculative or non-speculative; and
a pending miss request indicator which indicates, in response to a cache hit, that data targeted by the store instruction is available in a cache;
wherein the processor is configured to:
store a first store instruction in a first entry of the store queue; and
store a second store instruction in a second entry of the store queue, wherein the first store instruction is older than the second store instruction; and
in response to determining the second store instruction is ready to commit to a memory hierarchy, the processor is configured to:
allow the second store instruction to commit before the first store instruction, in response to determining:
an indication in the second entry indicates the second store instruction is non-speculative; and
a pending miss indicator in the second entry indicates data targeted by the second instruction is available in the cache;
prevent the second store instruction from committing to the memory hierarchy before the first store instruction, in response to determining that at least one store instruction in the store queue older than the second store instruction is speculative.

14. The computing system as recited in claim 13, wherein store instructions in the store queue that are speculative are subject to being flushed, and store instructions in the store queue that are non-speculative are not subject to being flushed.

15. The computing system as recited in claim 13, wherein an indication in an entry of the store queue indicates a corresponding store instruction is non-speculative in response to a determination that all older stores to a same address as the store instruction are complete, all older loads are complete, all older barrier instructions are complete, and all older branch instructions are resolved.

16. The computing system as recited in claim 13, wherein the processor is configured to:
move the first and second store instructions from the store queue to a write buffer when the first and second store instructions become non-speculative;
commit the second store instruction to a cache from the write buffer responsive to determining the second store instruction is a cache hit; and
delay committing the first store instruction to the cache from the write buffer responsive to determining the first store instruction is a cache miss.

17. The computing system as recited in claim 15, wherein the processor is configured to prevent a non-speculative store instruction from moving from the store queue to the write buffer responsive to determining both a youngest entry and an oldest entry in the write buffer are cache misses.

\* \* \* \* \*